United States Patent
Sakhnini et al.

(10) Patent No.: US 12,052,772 B2
(45) Date of Patent: Jul. 30, 2024

(54) ADDITIONAL RACH REFERENCE SLOTS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 17/652,675

(22) Filed: Feb. 25, 2022

(65) Prior Publication Data

US 2022/0361255 A1 Nov. 10, 2022

Related U.S. Application Data

(60) Provisional application No. 63/186,746, filed on May 10, 2021.

(51) Int. Cl.
*H04W 74/0833* (2024.01)
*H04W 56/00* (2009.01)
*H04W 72/0446* (2023.01)
*H04W 74/08* (2009.01)

(52) U.S. Cl.
CPC ..... *H04W 74/0841* (2013.01); *H04W 56/001* (2013.01); *H04W 72/0446* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 2019/0150190 A1* | 5/2019 | Kim | H04B 7/0695 370/329 |
| 2019/0281624 A1* | 9/2019 | Kim | H04J 13/0062 |
| 2020/0366451 A1* | 11/2020 | Lei | H04W 74/0833 |
| 2020/0396701 A1* | 12/2020 | Yi | H04W 52/383 |
| 2022/0225416 A1* | 7/2022 | He | H04L 5/0094 |
| 2023/0345546 A1* | 10/2023 | Lin | H04W 74/0833 |

* cited by examiner

*Primary Examiner* — Kenny S Lin
(74) *Attorney, Agent, or Firm* — Procopio, Cory, Hargreaves & Savitch LLP

(57) ABSTRACT

A base station may select whether to configure one or more second RACH reference slots associated with a plurality of first RACH reference slots in a RACH configuration period. The one or more second RACH reference slots may be new RACH reference slots, and the plurality of first RACH reference slots may be previously existing RACH reference slots. The base station may identify, upon selecting to configure the one or more second RACH reference slots, a RACH reference slot configuration including the one or more second RACH reference slots associated with the plurality of first RACH reference slots in the RACH configuration period. The base station may transmit, to at least one UE, an indication of the RACH reference slot configuration including the one or more second RACH reference slots associated with the plurality of first RACH reference slots.

12 Claims, 11 Drawing Sheets

ADDITIONAL RACH REFERENCE SLOTS

CROSS REFERENCE TO RELATED APPLICATION(S)

This application claims the benefit of and priority to U.S. Provisional Application Ser. No. 63/186,746, entitled "Additional RACH Reference Slots" and filed on May 10, 2021, which is expressly incorporated by reference herein in its entirety.

TECHNICAL FIELD

The present disclosure relates generally to communication systems, and more particularly, to increasing the number of random access channel (RACH) reference slots in the time domain for wireless communication at higher bands.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, an indication of a random access channel (RACH) reference slot configuration including one or more second RACH reference slots associated with a plurality of first RACH reference slots. The apparatus may transmit, to the base station, RACH communication based on the RACH reference slot configuration.

In an aspect of the disclosure, a method, a computer-readable medium, and an apparatus are provided. The apparatus may be a base station. The apparatus may select whether to configure one or more second RACH reference slots associated with a plurality of first RACH reference slots in a RACH configuration period. The apparatus may identify, upon selecting to configure the one or more second RACH reference slots, a RACH reference slot configuration including the one or more second RACH reference slots associated with the plurality of first RACH reference slots in the RACH configuration period. The apparatus may transmit, to at least one UE, an indication of the RACH reference slot configuration including the one or more second RACH reference slots associated with the plurality of first RACH reference slots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
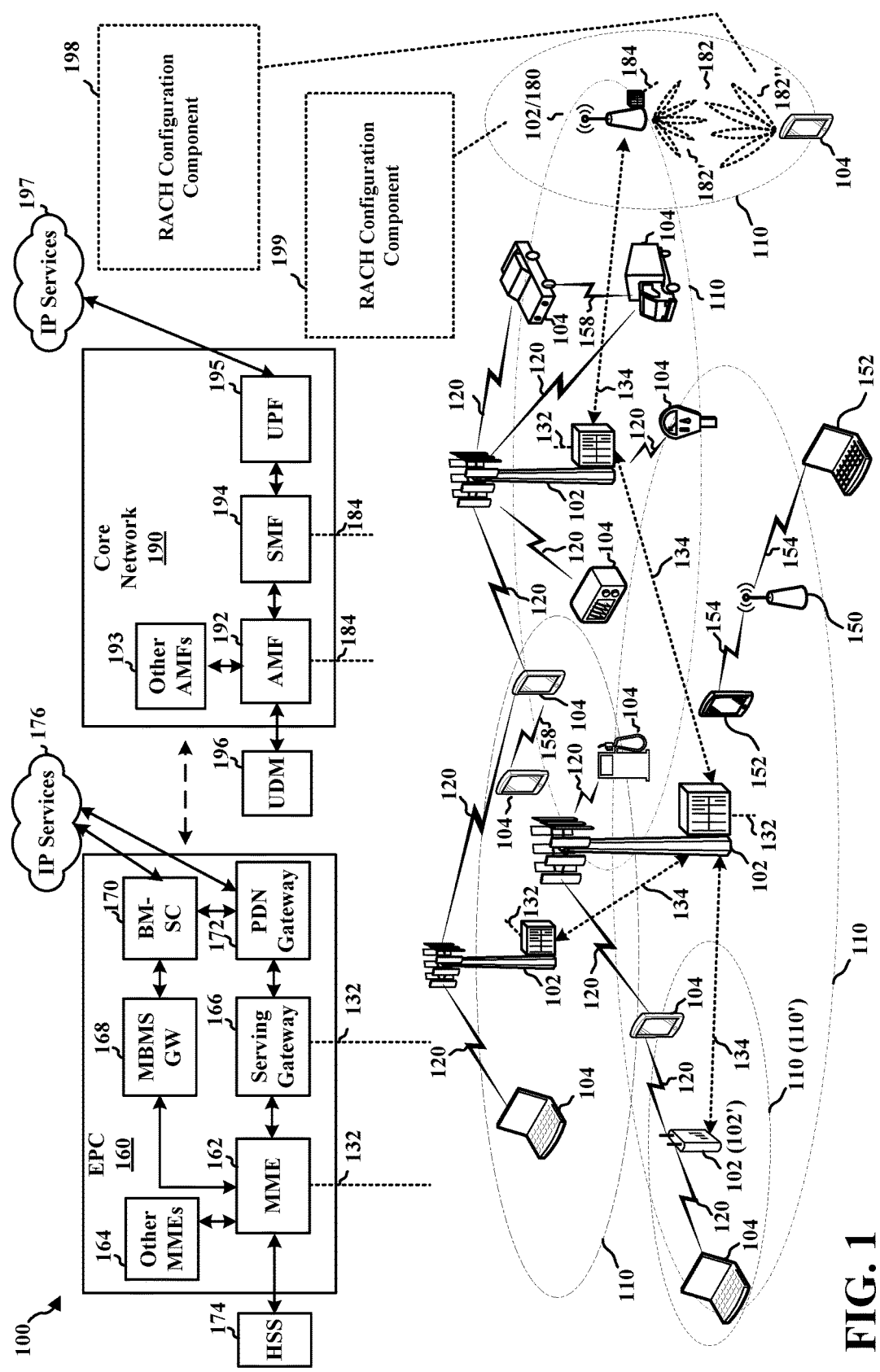
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a RACH configuration component 198 that may be configured to receive, from a base station, an indication of a RACH reference slot configuration including one or more second RACH reference slots associated with a plurality of first RACH reference slots. The RACH configuration component 198 may be configured to transmit, to the base station, RACH communication based on the RACH reference slot configuration. In certain aspects, the base station 180 may include a RACH configuration component 199 that may be configured to select whether to configure one or more second RACH reference slots associated with a plurality of first RACH reference slots in a RACH configuration period. The RACH configuration component 199 may be configured to identify, upon selecting to configure the one or more second RACH reference slots, a RACH reference slot configuration including the one or more second RACH reference slots associated with the plurality of first RACH reference slots in the RACH configuration period. The RACH configuration component 199 may be configured to transmit, to at least one UE, an indication of the RACH reference slot configuration including the one or more second RACH reference slots associated with the plurality of first RACH reference slots. Although the following description may be focused on 5G NR, the concepts described herein may be applicable to other similar areas, such as LTE, LTE-A, CDMA, GSM, and other wireless technologies.

Figure 2:
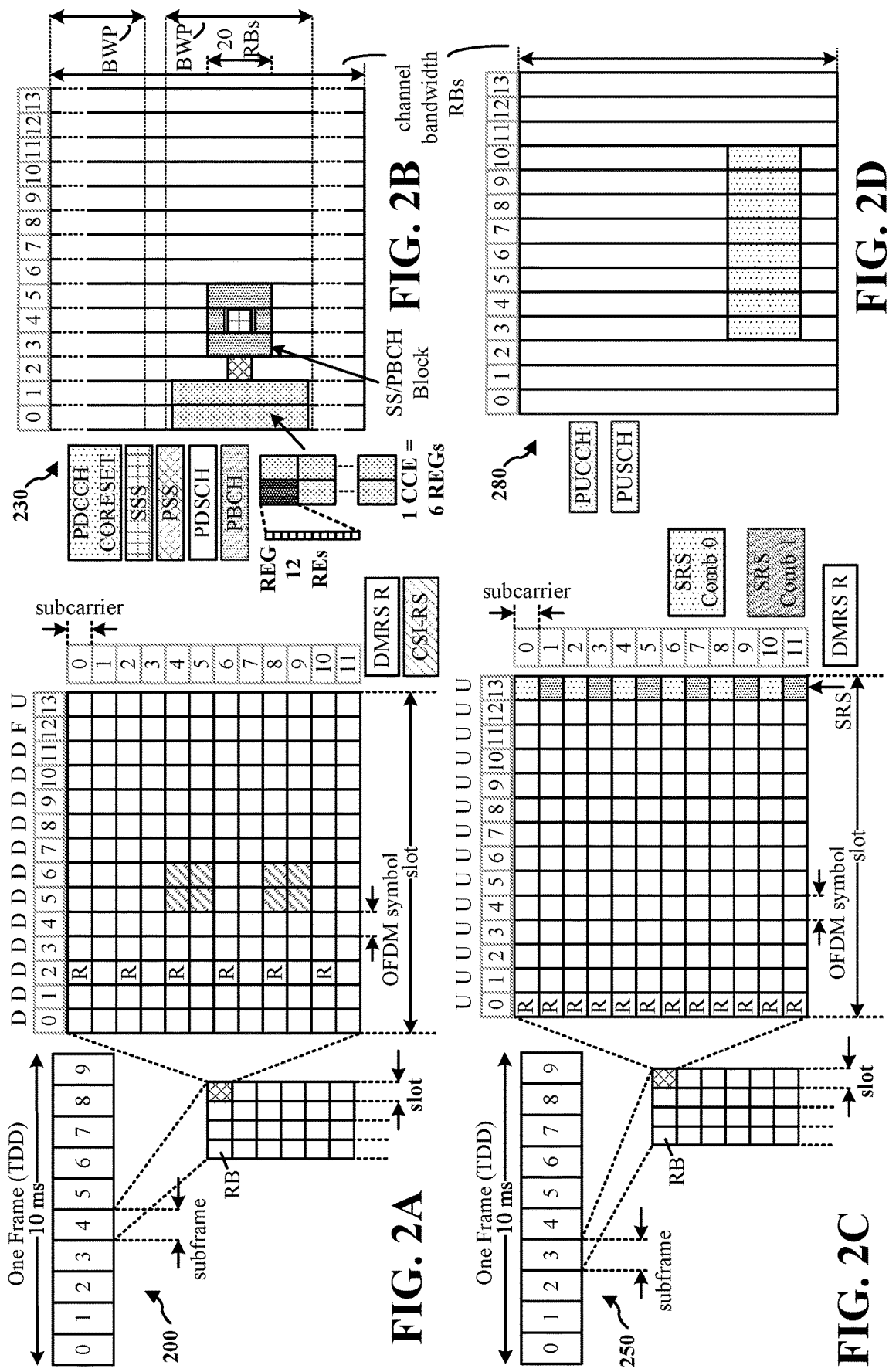
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu} \cdot 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
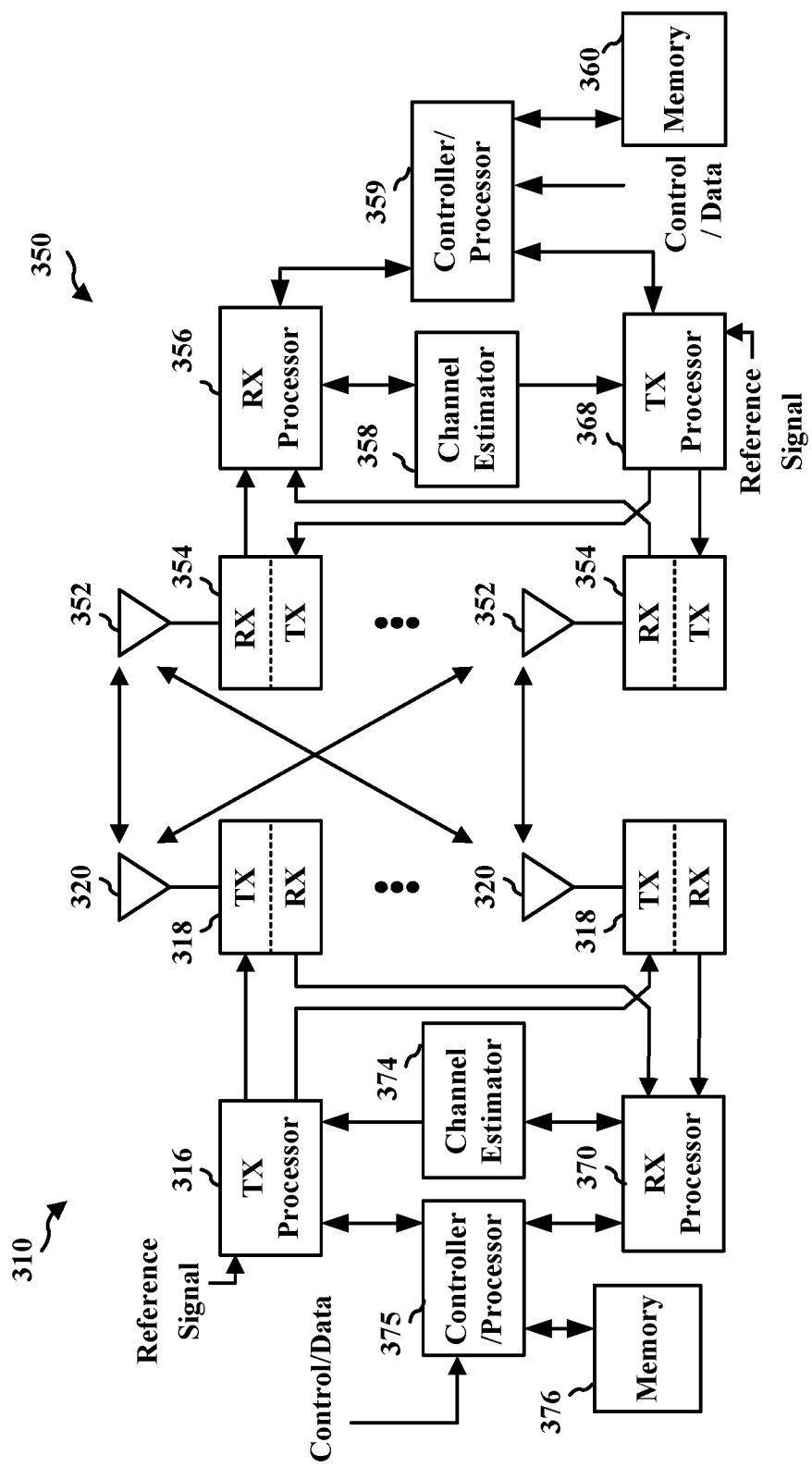
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In one aspect, 5G NR may be operated in higher bands, e.g., in a frequency range between 52.6 GHz and 71 GHz. Certain physical layer aspects of initial access may be adapted for the higher band operation. In particular, in addition to the 120 kHz SCS, 480 kHz and 960 kHz SCSs may be specified, and maximum bandwidth(s) for operation in this frequency range for data and control channels and reference signals may be defined. The normal cyclic prefix (NCP) may be supported. Except for timing line related aspects, a common design framework may be used for SCSs ranging from 480 kHz to 960 kHz. Up to 64 SSB beams for licensed and unlicensed operation in this frequency range may be supported. 120 kHz SCS for SSB and 120 kHz SCS for initial access related signals/channels in an initial BWP may be supported. Additional SCSs (e.g., 240 kHz, 480 kHz, 960 kHz) for SSB, and additional SCSs (e.g., 480 kHz, 960 kHz) for initial access related signals/channels in the initial BWP may be specified. Additional SCSs (e.g., 480 kHz, 960 kHz) for SSB for cases other than initial access may also be specified. Support for physical random access channel (PRACH) sequence lengths L (e.g., L=139, L=571, and/or L=1151) may be specified. Support for a RACH occasion (RO) configuration for non-consecutive ROs in the time domain for operation in a shared spectrum may be specified.

Figure 4:
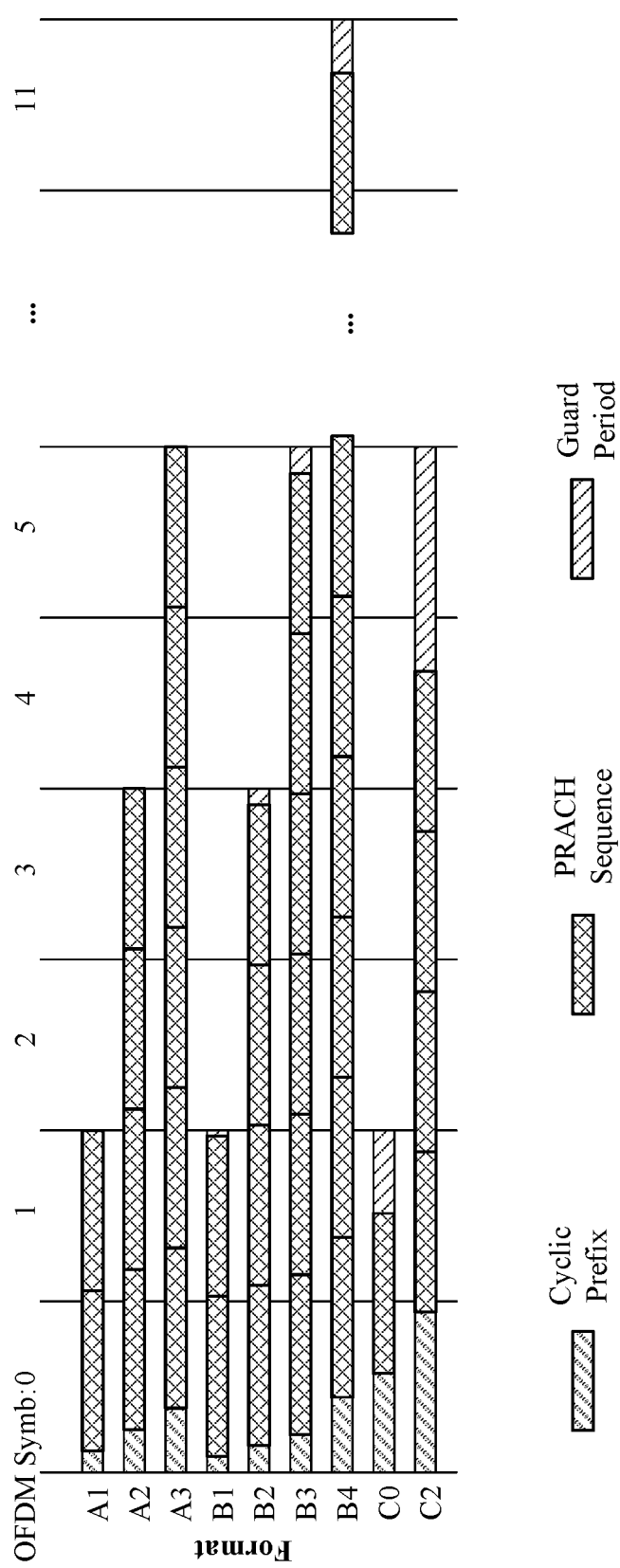
FIG. 4 is an example diagram illustrating PRACH preamble formats.

FIG. 4 is an example diagram 400 illustrating PRACH preamble formats. FIG. 4 illustrates Formats A1 to A3, B1 to B4, C0, and C2 for the frequency range FR2 and for numerology $\mu \Sigma \{2,3\}$. Each format may be associated with a PRACH sequence (e.g., Zadoff-Chu sequence) length L, a number of OFDM symbols, a number of repetitions of the PRACH sequence, a CP format, and a guard period format (e.g., a number of guard samples). For example, as shown in FIG. 4, a PRACH preamble of Format A1 may last 2 OFDM symbols, within which the PRACH sequence may be repeated once (for a total of two times) and there may be no guard period. In general, A formats may be associated with no guard period, B formats may be associated with short guard periods, and C formats may be associated with long guard periods.

Figure 5:
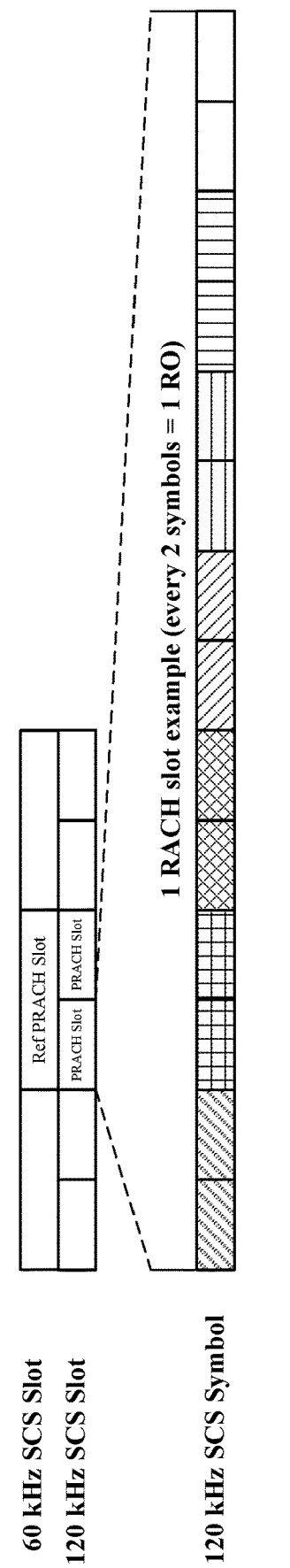
FIG. 5 is an example diagram illustrating RACH reference slots, RACH slots, and ROs.

FIG. 5 is an example diagram 500 illustrating RACH reference slots, RACH slots, and ROs. Herein the terms RACH (reference) slots and PRACH (reference) slots may be used interchangeably. A PRACH preamble may be sent from the UE to the base station on an RO. An RO may be a set of time/frequency resources, and may carry the repeated PRACH preambles (e.g., in Formats Ax, Bx, or Cx). A RACH reference slot (also referred to as a reference RACH slot) may be defined corresponding to a 60 kHz SCS slot. For the frequency range FR2, one or two RACH slots (using the 120 kHz SCS) may be defined in a RACH reference slot. In FIG. 5, two RACH slots may be defined in a RACH reference slot. Multiple ROs may be configured in a RACH slot. Each RO may correspond to a preconfigured number of symbols in the RACH slot. In FIG. 5, each RO may correspond to two symbols. A set of RACH slots may repeat every RACH configuration period.

The SSB to RO association may be used by the base station to determine which beam the UE has acquired or is using (e.g., in a beam establishment process). One SSB may be associated with one or more ROs. Further, more than one SSB may be associated with one RO. The SSB to RO association may be performed in the frequency domain first, then in the time domain within a RACH slot, and then in the time domain across RACH slots.

An association period may be defined. In particular, an association period may include such a minimum number of RACH configuration periods that all SSB beams may be mapped to ROs.

The location of RACH reference slots may be based on prespecified random access configurations. For example, the PRACH configuration #0 for the frequency range FR2 and an unpaired spectrum may be associated with the PRACH preamble Format A1. The PRACH configuration period may last 16 frames. The slot numbers for the 60 kHz SCS PRACH reference slots may be 4, 9, 14, 19, 24, 29, 34, 39 (out of slots 0-39 in a frame). There may be two RACH slots within a 60 kHz SCS slot, and there may be six ROs within a RACH slot.

For initial access and non-initial access use cases, 120 kHz PRACH SCS with the PRACH sequence length L=571 and 1151 (in addition to L=139) for PRACH Formats A1 to A3, B1 to B4, C0, and C2 may be supported. For non-initial access use cases, if 480 kHz and/or 960 kHz SSB SCS is supported, 480 kHz and/or 960 kHz PRACH SCS with the PRACH sequence length L=139 for PRACH Formats A1 to A3, B1 to B4, C0, and C2, respectively, may be supported. The PRACH sequence length L=571 and 1151 may be supported. For initial access use cases, 480 kHz and/or 960 kHz PRACH SCS may be supported if 480 kHz and/or 960 kHz SSB SCS is supported for initial access.

The minimum PRACH configuration period may be 10 ms (as in FR2). For RO configuration for PRACH with 480/960 kHz SCS, configurations of 480/960 kHz PRACH ROs using 60 kHz or 120 kHz SCS reference slots may be specified. The configurations may include the location of 480/960 kHz SCS PRACH slot per reference slot, the location of the duration containing the 480/960 kHz SCS PRACH slot pattern within the 10 ms. Calculation of the random access— radio network temporary identifier (RA-RNTI) may be affected.

Up to eight ROs may be multiplexed in the frequency domain. However, for higher bands, using eight ROs in the frequency domain may not be possible since the bandwidth may exceed the allowed maximum UE bandwidth of 400 MHz (e.g., for the 120 kHz PRACH SCS and a larger PRACH sequence length, e.g., L=1151, the total bandwidth of eight ROs may exceed 1 GHz). This may be similar to a situation where the maximum UE bandwidth is at 100 MHz and eight frequency domain ROs (with 120 kHz PRACH SCS and L=139) may not be possible.

Since the number of ROs multiplexed in the frequency domain may have to be reduced, to maintain the same system capacity, more ROs may be provided in the time domain. In other words, additional RACH reference slots may be provided in a configuration period.

In one aspect, the existing design may still be used with a longer association period. For example, instead of having one RACH configuration period per association period, each association period may include two RACH configuration periods. This may not be desirable because it may slow down the system for initial access. A UE may wait longer for its turn, and may wake up more often to search for and wait for the corresponding RO, which may cause the UE to consume more power.

In one aspect, more 60 kHz SCS RACH reference slots in a configuration period may be added with explicit specification. This may be a non-trivial endeavor, and hence may not be desirable either.

Figure 6:
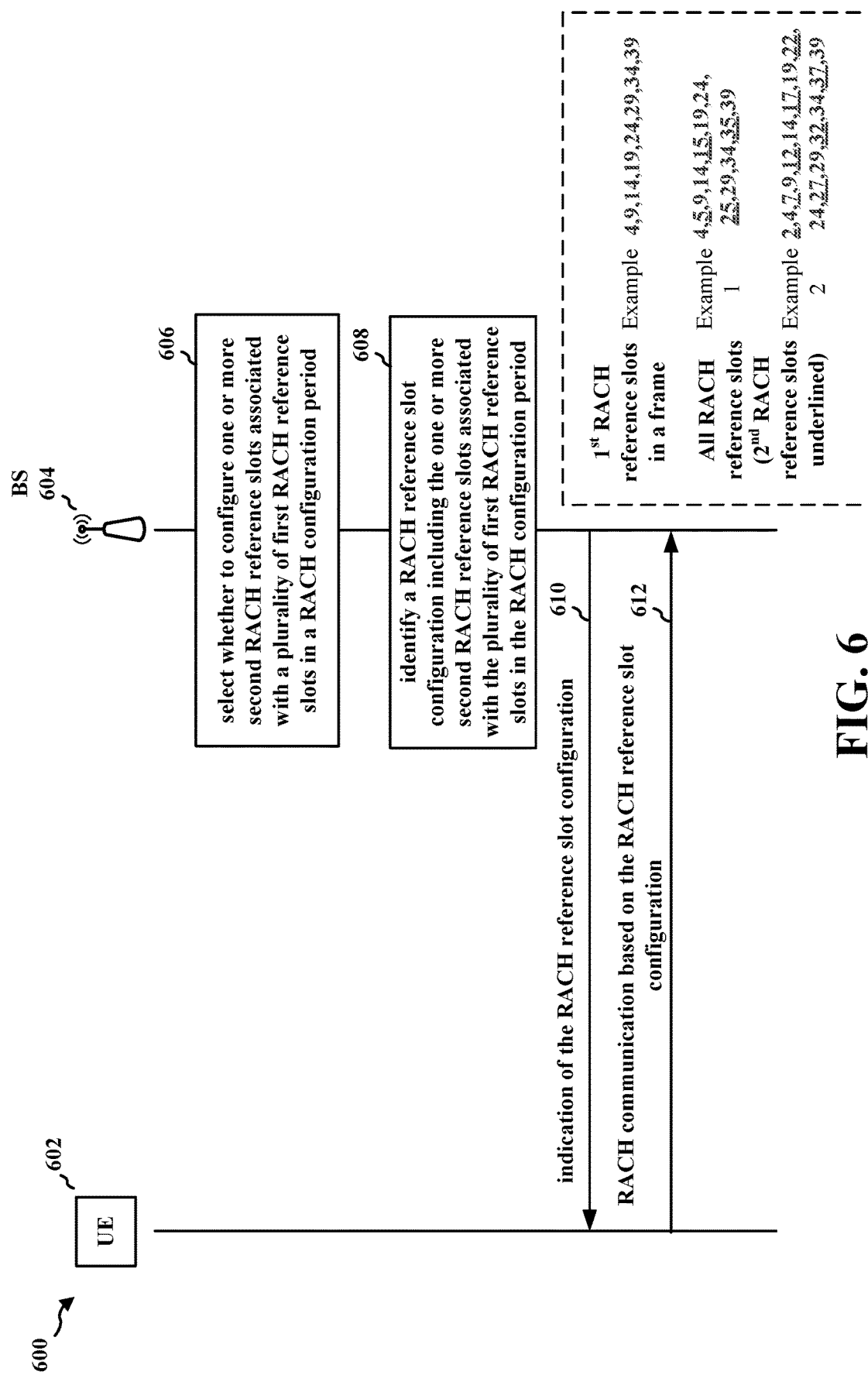
FIG. 6 is a communication flow of a method of wireless communication.

FIG. 6 is a communication flow 600 of a method of wireless communication. The UE 602 may correspond to the UE 104/350. The base station 604 may correspond to the base station 102/180/310. At 606, the base station 604 may select whether to configure one or more second RACH reference slots associated with a plurality of first RACH reference slots in a RACH configuration period. At 608, the base station 604 may identify, upon selecting at 606 to configure the one or more second RACH reference slots, a RACH reference slot configuration including the one or more second RACH reference slots associated with the plurality of first RACH reference slots in the RACH configuration period. At 610, the base station 604 may transmit to the UE 602, and the UE 602 may receive from the base station 604, an indication of the RACH reference slot configuration including the one or more second RACH reference slots associated with the plurality of first RACH reference slots. The indication may be transmitted and received via a system information block (SIB) 1 (SIB1), RRC signaling, a media access control (MAC)— control element (CE) (MAC-CE), or DCI. At 612, the UE 602 may transmit to the base station 604, and the base station 604 may receive from the UE 602, RACH communication based on the RACH reference slot configuration. The one or more second RACH reference slots may be new RACH reference slots, and the plurality of first RACH reference slots may be previously existing RACH reference slots.

In one aspect, more 60 kHz SCS RACH reference slots may be added in a configuration period by adding N additional RACH reference slots every M RACH reference slots according to a PRACH configuration, where M and N are integers. N and M may be specified or indicated. N may be either added before or after the previously existing slot number. The impact to the previously existing specification may be minimal. For example, the slot numbers for the RACH reference slots according to the PRACH configuration #0 described above may include 4, 9, 14, 19, 24, 29, 34, 39. After adding N=1 additional RACH reference slot every M=2 RACH reference slots, starting after the first previously existing (first) RACH reference slot, the slot numbers for both the new (second) and the previously existing (first) RACH reference slots may include 4, 5, 9, 14, 15, 19, 24, 25, 29, 34, 35, 39, where the new RACH reference slots may include slots 5, 15, 25, 35, each of which may be one slot after the previously existing RACH reference slot directly preceding it.

In other words, beginning with a first N of the one or more second RACH reference slots located before or after a predetermined or preconfigured one of the plurality of first (previously existing) RACH reference slots, a subsequent N of the one or more second (new) RACH reference slots may be located after every M of the plurality of first RACH reference slots, where M and N are integers. In one aspect, each of the one or more second RACH reference slots that is associated with a preceding first RACH reference slot may have a predetermined or preconfigured slot number distance from the preceding first RACH reference slot. In one aspect, each of the one or more second RACH reference slots that is associated with a subsequent first RACH reference slot may have a predetermined or preconfigured slot number distance from the subsequent first RACH reference slot. In one aspect, N may be greater than or equal to 2, and any two of the one or more second RACH reference slots that are adjacent to each other may have a predetermined or preconfigured slot number distance between them.

This may not work with some PRACH configurations because some PRACH configurations may have back-to-back RACH reference slots, and not enough locations may be available for the new RACH reference slots. PRACH configurations with which the above-described aspects may not be used may be explicitly specified (especially if N>1).

In one aspect, more 60 kHz SCS RACH reference slots in a configuration period may be added by adding one or more offset versions (offset=O) of the slot number pattern to the previously existing slot number pattern according to a PRACH configuration. The offset O may be specified or indicated, and may be either added or subtracted to the previously existing slot number (stated differently, the offset O may be positive or negative). The impact to the previously existing specification may be minimal. For example, the slot numbers for the RACH reference slots according to the PRACH configuration #0 described above may include 4, 9, 14, 19, 24, 29, 34, 39. After adding an offset version of the slot number pattern to the previously existing slot number pattern, where the offset O is −2 (accordingly, the offset version of the slot number pattern may be 2, 7, 12, 17, 22, 27, 32, 37), the slot numbers for both the new (second) and the previously existing (first) RACH reference slots may include 2, 4, 7, 9, 12, 14, 17, 19, 22, 24, 27, 29, 32, 34, 37, 39.

In other words, a one-to-one correspondence may exist between each of the one or more second RACH reference slots and each of the plurality of first RACH reference slots, and each of the one or more second RACH reference slots and the corresponding one of the plurality of first RACH reference slots may be associated with a predetermined or preconfigured slot number offset. In different configurations, the predetermined or preconfigured slot number offset may be positive or negative.

In one aspect, the additional (second, new) RACH reference slots in a configuration period may be used for new/additional ROs/beams to maintain or even increase the RACH communication capacity. In other words, all of the one or more second RACH reference slots may be associated with different UEs or beams than the plurality of first RACH reference slots.

In one aspect, the additional (second, new) RACH reference slots in a configuration period may be used for repetitions of previously existing ROs/beams for coverage enhancement. For example, a UE may transmit the RACH communication on ROs in one previously existing RACH reference slot and one additional RACH reference slot. In other words, all of the one or more second RACH reference slots are associated with same UEs or beams as the plurality of first RACH reference slots.

In one aspect, a combination of the uses of the additional RACH reference slots in a configuration period described above may take place. In other words, at least some of the one or more second RACH reference slots may be associated with different UEs or beams than the plurality of first RACH reference slots, and at least some of the one or more second RACH reference slots may be associated with same UEs or beams as the plurality of first RACH reference slots.

In one aspect, the SSB to PRACH association may be created for all RACH reference slots including the new RACH reference slots in a uniform way (e.g., mapping in the frequency domain first, and then in the time domain) as they are created for the previously existing RACH reference slots. No distinction may be made between the new RACH reference slots and the previously existing RACH reference slots. Of course, the total number of ROs may be different. In other words, all of a plurality of SSBs may be associated with a plurality of RACH reference slots in a same association pattern, where the plurality of RACH reference slots includes the one or more second RACH reference slots and the plurality of first RACH reference slots.

In one aspect, the SSB to PRACH association may be created separately for the new RACH reference slots and for the previously existing RACH reference slots. For example, one SSB to RACH association may use one RO interlace and anther SSB to RACH association may use another RO interlace. In another example, the first half of all SSBs may be mapped to previously existing RACH reference slots, and the second half of all SSBs may be mapped to new RACH reference slots. In other words, one or more first SSBs may be associated with at least some of a plurality of RACH reference slots in a first association pattern, and one or more second SSBs may be associated with at least some of the plurality of RACH reference slots in a second association pattern, where the plurality of RACH reference slots includes the one or more second RACH reference slots and the plurality of first RACH reference slots.

This may not work with some PRACH configurations because some PRACH configurations may have back-to-back RACH reference slots, and not enough locations may be available for the new RACH reference slots. PRACH configurations with which the above-described aspects may not be used may be explicitly specified.

Figure 7:
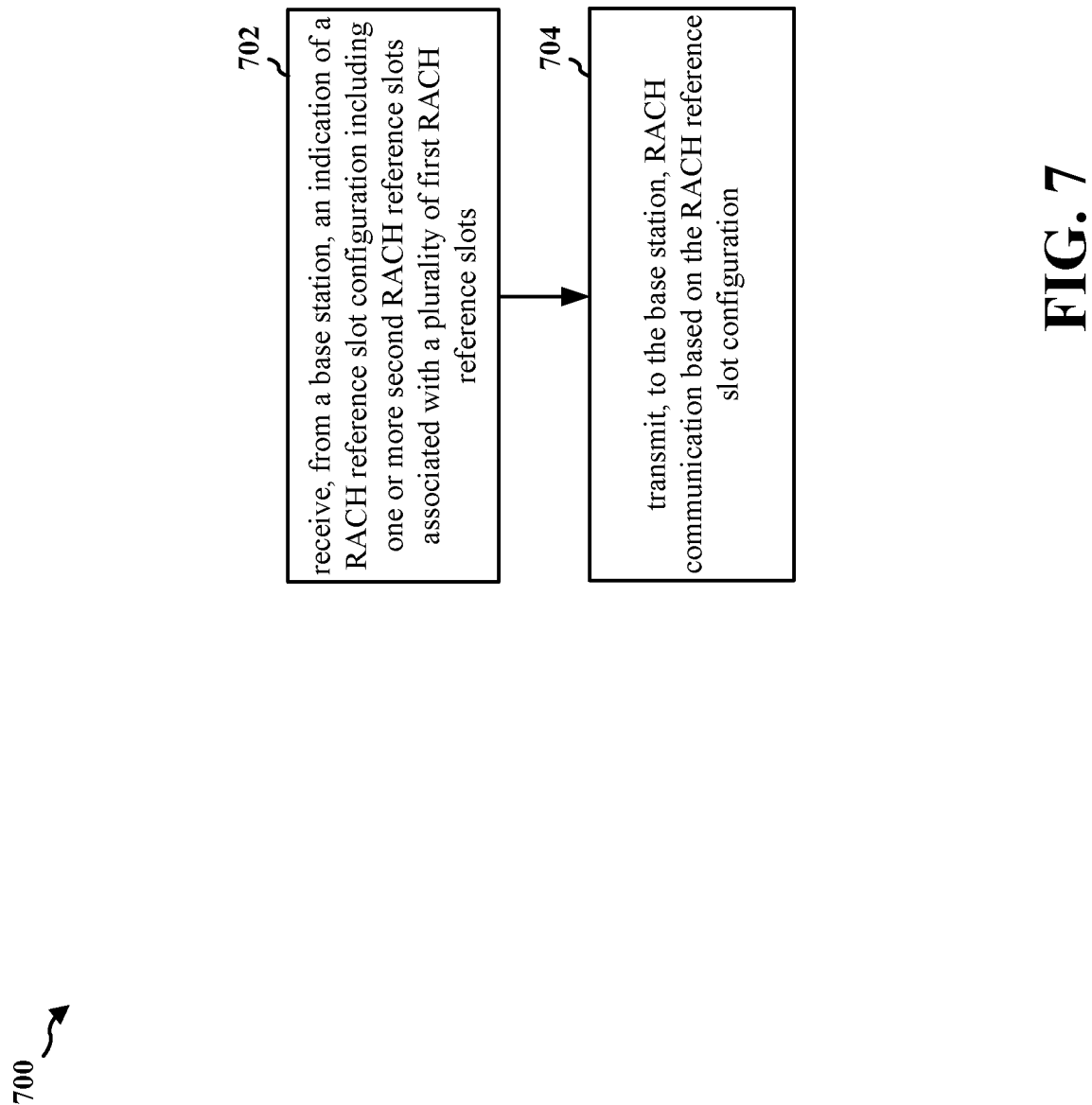
FIG. 7 is a flowchart of a method of wireless communication.

FIG. 7 is a flowchart 700 of a method of wireless communication. The method may be performed by a UE (e.g., the UE 104/350/602; the apparatus 1002). At 702, the UE may receive, from a base station, an indication of a RACH reference slot configuration including one or more second RACH reference slots associated with a plurality of first RACH reference slots. For example, 702 may be performed by the RACH configuration component 1040 in FIG. 10. Referring to FIG. 6, at 610, the UE 602 may receive, from a base station 604, an indication of a RACH reference slot configuration including one or more second RACH reference slots associated with a plurality of first RACH reference slots.

At 704, the UE may transmit, to the base station, RACH communication based on the RACH reference slot configuration. For example, 704 may be performed by the RACH configuration component 1040 in FIG. 10. Referring to FIG. 6, at 612, the UE 602 may transmit, to the base station 604, RACH communication based on the RACH reference slot configuration.

In one configuration, the indication may be received via a SIB1, RRC signaling, a MAC-CE, or DCI.

In one configuration, the one or more second RACH reference slots may be new RACH reference slots, and the plurality of first RACH reference slots may be previously existing RACH reference slots.

In one configuration, the RACH reference slot configuration may include each of the one or more second RACH reference slots configured to be adjacent to at least one of the plurality of first RACH reference slots.

In one configuration, the RACH reference slot configuration may be predetermined or preconfigured.

In one configuration, beginning with a first N of the one or more second RACH reference slots located before or after a predetermined or preconfigured one of the plurality of first RACH reference slots, a subsequent N of the one or more second RACH reference slots may be located after every M of the plurality of first RACH reference slots, where M and N are integers.

In one configuration, each of the one or more second RACH reference slots that is associated with a preceding first RACH reference slot may have a predetermined or preconfigured slot number distance from the preceding first RACH reference slot.

In one configuration, each of the one or more second RACH reference slots that is associated with a subsequent first RACH reference slot may have a predetermined or preconfigured slot number distance from the subsequent first RACH reference slot.

In one configuration, N may be greater than or equal to 2, and any two of the one or more second RACH reference slots that are adjacent to each other may have a predetermined or preconfigured slot number distance between them.

In one configuration, a one-to-one correspondence may exist between each of the one or more second RACH reference slots and each of the plurality of first RACH reference slots, and each of the one or more second RACH reference slots and the corresponding one of the plurality of first RACH reference slots may be associated with a predetermined or preconfigured slot number offset.

In one configuration, the predetermined or preconfigured slot number offset may be positive or negative.

In one configuration, all of the one or more second RACH reference slots may be associated with different UEs or beams than the plurality of first RACH reference slots.

In one configuration, all of the one or more second RACH reference slots may be associated with same UEs or beams as the plurality of first RACH reference slots.

In one configuration, at least some of the one or more second RACH reference slots may be associated with different UEs or beams than the plurality of first RACH reference slots, and at least some of the one or more second RACH reference slots may be associated with same UEs or beams as the plurality of first RACH reference slots.

In one configuration, all of a plurality of SSBs may be associated with a plurality of RACH reference slots in a same association pattern, and the plurality of RACH reference slots may include the one or more second RACH reference slots and the plurality of first RACH reference slots.

In one configuration, one or more first SSBs may be associated with at least some of a plurality of RACH reference slots in a first association pattern. One or more second SSBs may be associated with at least some of the plurality of RACH reference slots in a second association pattern. The plurality of RACH reference slots may include the one or more second RACH reference slots and the plurality of first RACH reference slots.

Figure 8:
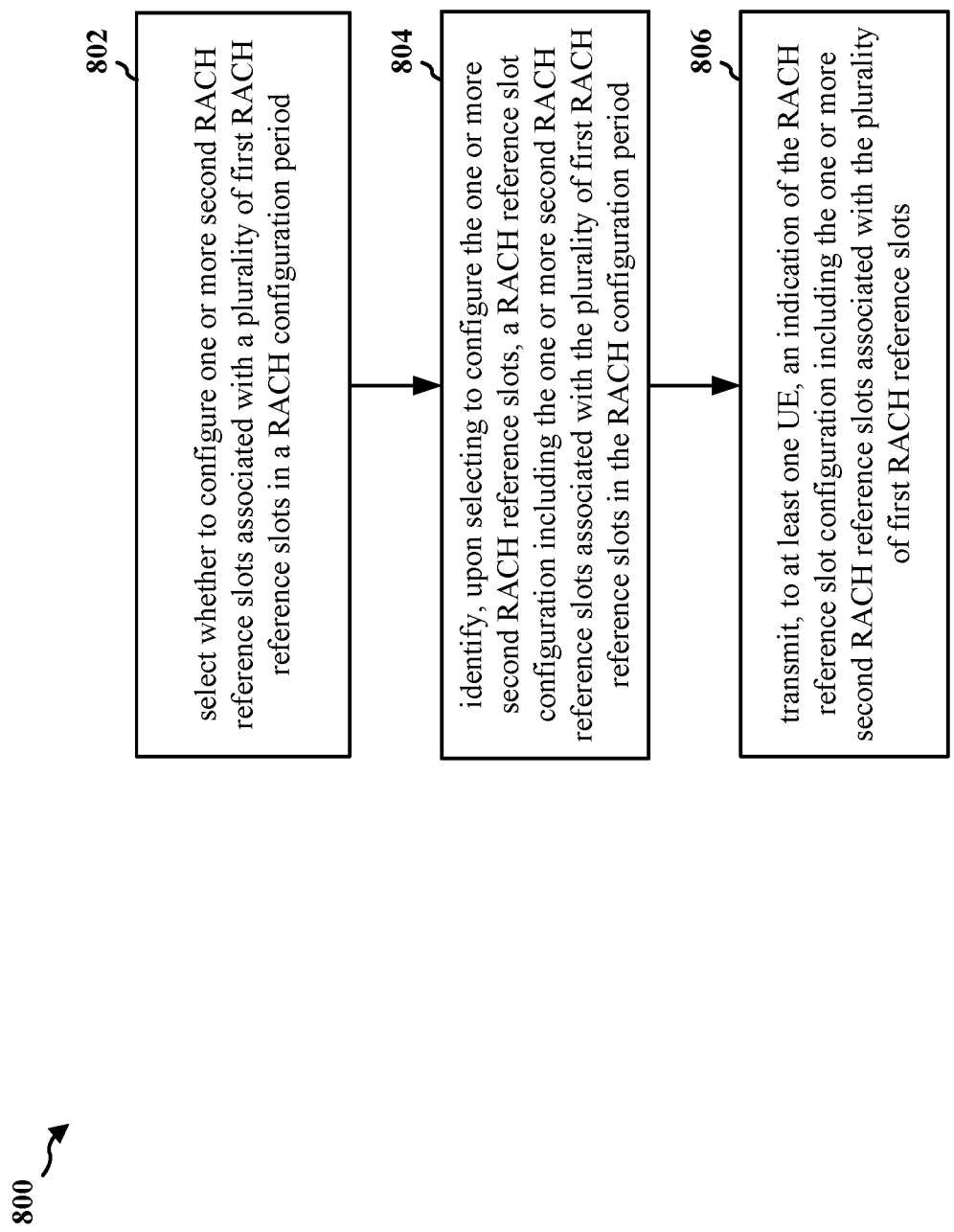
FIG. 8 is a flowchart of a method of wireless communication.

FIG. 8 is a flowchart 800 of a method of wireless communication. The method may be performed by a base station (e.g., the base station 102/180/310/604; the apparatus 1102). At 802, the base station may select whether to configure one or more second RACH reference slots associated with a plurality of first RACH reference slots in a RACH configuration period. For example, 802 may be performed by the RACH configuration component 1140 in FIG. 11. Referring to FIG. 6, at 606, the base station 604 may select whether to configure one or more second RACH reference slots associated with a plurality of first RACH reference slots in a RACH configuration period.

At 804, the base station may identify, upon selecting to configure the one or more second RACH reference slots, a RACH reference slot configuration including the one or more second RACH reference slots associated with the plurality of first RACH reference slots in the RACH configuration period. For example, 804 may be performed by the RACH configuration component 1140 in FIG. 11. Referring to FIG. 6, at 608, the base station 604 may identify, upon selecting at 606 to configure the one or more second RACH reference slots, a RACH reference slot configuration including the one or more second RACH reference slots associated with the plurality of first RACH reference slots in the RACH configuration period.

At 806, the base station may transmit, to at least one UE, an indication of the RACH reference slot configuration including the one or more second RACH reference slots associated with the plurality of first RACH reference slots. For example, 806 may be performed by the RACH configuration component 1140 in FIG. 11. Referring to FIG. 6, at 610, the base station 604 may transmit, to at least one UE 602, an indication of the RACH reference slot configuration including the one or more second RACH reference slots associated with the plurality of first RACH reference slots.

Figure 9:
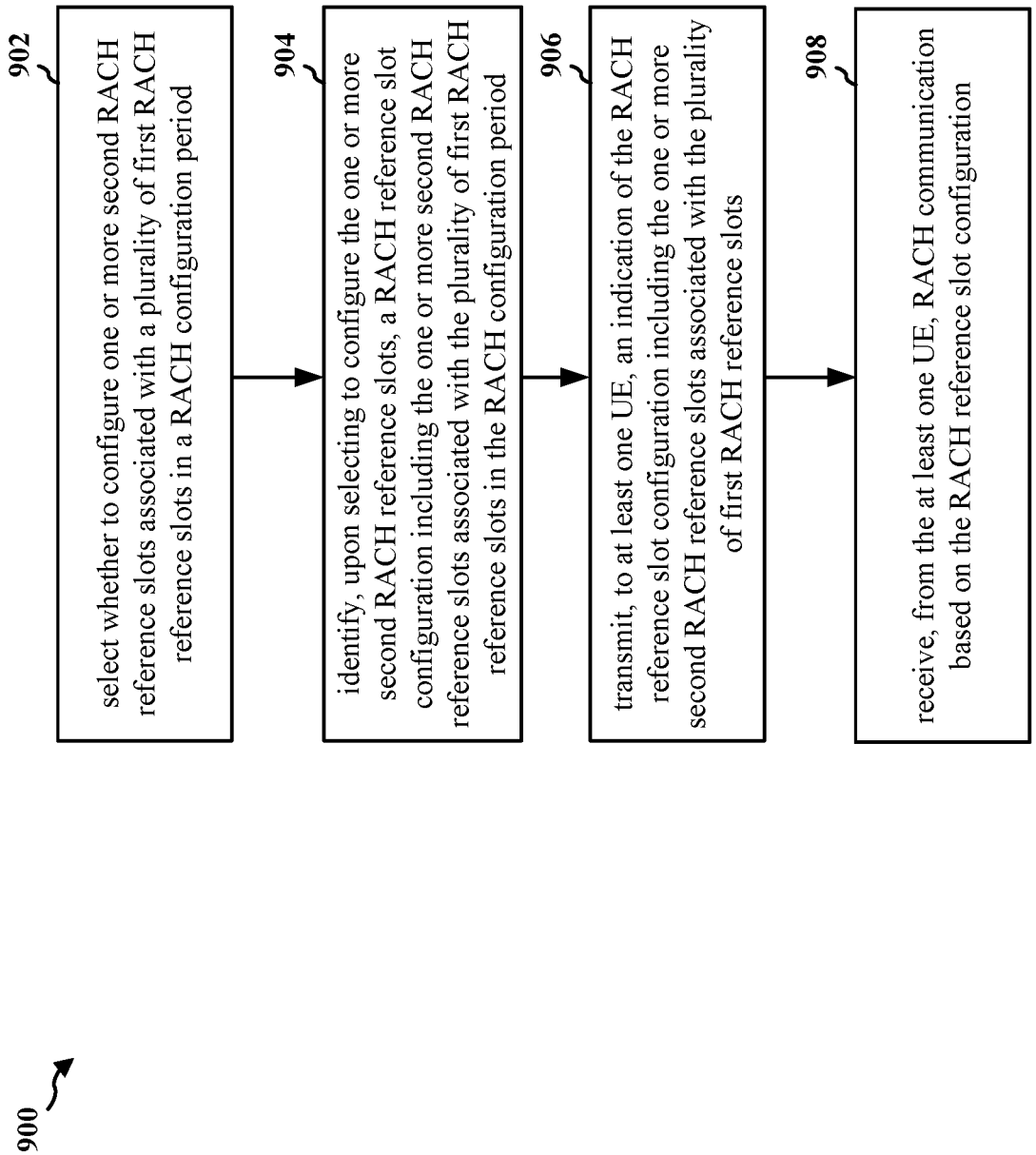
FIG. 9 is a flowchart of a method of wireless communication.

FIG. 9 is a flowchart 900 of a method of wireless communication. The method may be performed by a base station (e.g., the base station 102/180/310/604; the apparatus 1102). At 902, the base station may select whether to configure one or more second RACH reference slots associated with a plurality of first RACH reference slots in a RACH configuration period. For example, 902 may be performed by the RACH configuration component 1140 in FIG. 11. Referring to FIG. 6, at 606, the base station 604 may select whether to configure one or more second RACH reference slots associated with a plurality of first RACH reference slots in a RACH configuration period.

At 904, the base station may identify, upon selecting to configure the one or more second RACH reference slots, a RACH reference slot configuration including the one or more second RACH reference slots associated with the plurality of first RACH reference slots in the RACH configuration period. For example, 904 may be performed by the RACH configuration component 1140 in FIG. 11. Referring to FIG. 6, at 608, the base station 604 may identify, upon selecting at 606 to configure the one or more second RACH reference slots, a RACH reference slot configuration including the one or more second RACH reference slots associated with the plurality of first RACH reference slots in the RACH configuration period.

At 906, the base station may transmit, to at least one UE, an indication of the RACH reference slot configuration including the one or more second RACH reference slots associated with the plurality of first RACH reference slots. For example, 906 may be performed by the RACH configuration component 1140 in FIG. 11. Referring to FIG. 6, at 610, the base station 604 may transmit, to at least one UE 602, an indication of the RACH reference slot configuration including the one or more second RACH reference slots associated with the plurality of first RACH reference slots.

In one configuration, at 908, the base station may receive, from the at least one UE, RACH communication based on the RACH reference slot configuration. For example, 908 may be performed by the RACH configuration component 1140 in FIG. 11. Referring to FIG. 6, at 612, the base station 604 may receive, from the at least one UE 602, RACH communication based on the RACH reference slot configuration.

In one configuration, the indication may be transmitted via a SIB1, RRC signaling, a MAC-CE, or DCI.

In one configuration, the one or more second RACH reference slots may be new RACH reference slots, and the plurality of first RACH reference slots may be previously existing RACH reference slots.

In one configuration, the RACH reference slot configuration may include each of the one or more second RACH reference slots configured to be adjacent to at least one of the plurality of first RACH reference slots.

In one configuration, the RACH reference slot configuration may be predetermined or preconfigured.

In one configuration, beginning with a first N of the one or more second RACH reference slots located before or after a predetermined or preconfigured one of the plurality of first RACH reference slots, a subsequent N of the one or more second RACH reference slot may be located after every M of the plurality of first RACH reference slots, where M and N are integers.

In one configuration, each of the one or more second RACH reference slots that is associated with a preceding first RACH reference slot may have a predetermined or preconfigured slot number distance from the preceding first RACH reference slot.

In one configuration, each of the one or more second RACH reference slots that is associated with a subsequent first RACH reference slot may have a predetermined or preconfigured slot number distance from the subsequent first RACH reference slot.

In one configuration, N is greater than or equal to 2, and any two of the one or more second RACH reference slots that are adjacent to each other may have a predetermined or preconfigured slot number distance between them.

In one configuration, a one-to-one correspondence may exist between each of the one or more second RACH reference slots and each of the plurality of first RACH reference slots, and each of the one or more second RACH reference slots and the corresponding one of the plurality of first RACH reference slots may be associated with a predetermined or preconfigured slot number offset.

In one configuration, the predetermined or preconfigured slot number offset may be positive or negative.

In one configuration, all of the one or more second RACH reference slots may be associated with different UEs or beams than the plurality of first RACH reference slots.

In one configuration, all of the one or more second RACH reference slots may be associated with same UEs or beams as the plurality of first RACH reference slots.

In one configuration, at least some of the one or more second RACH reference slots may be associated with different UEs or beams than the plurality of first RACH reference slots, and at least some of the one or more second RACH reference slots may be associated with same UEs or beams as the plurality of first RACH reference slots.

In one configuration, all of a plurality of SSBs may be associated with a plurality of RACH reference slots in a same association pattern, and the plurality of RACH reference slots may include the one or more second RACH reference slots and the plurality of first RACH reference slots.

In one configuration, one or more first SSBs may be associated with at least some of a plurality of RACH reference slots in a first association pattern. One or more second SSBs may be associated with at least some of the plurality of RACH reference slots in a second association pattern. The plurality of RACH reference slots may include the one or more second RACH reference slots and the plurality of first RACH reference slots.

Figure 10:
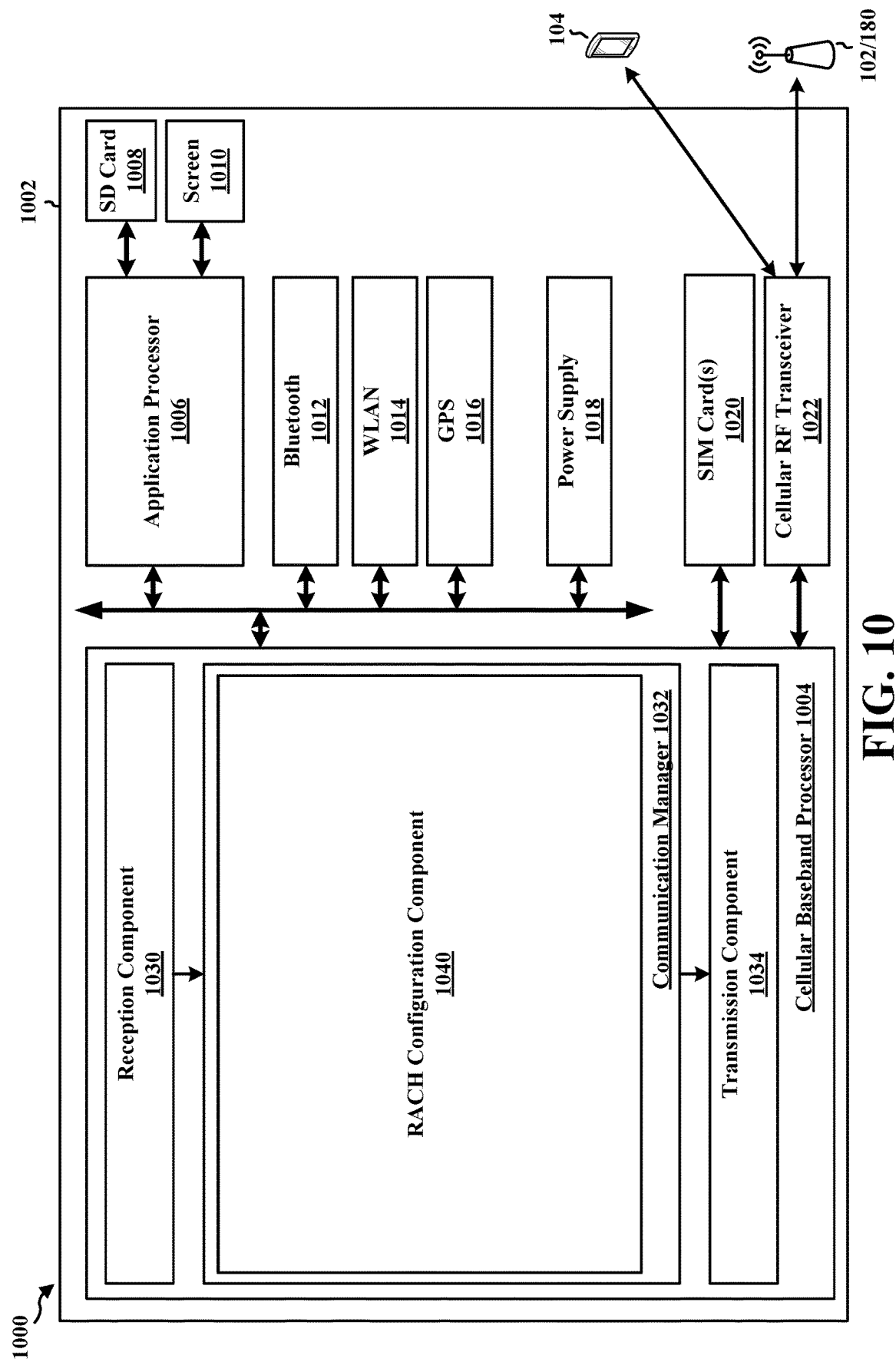
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a RACH configuration component 1040 that may be configured to receive, from a base station, an indication of a RACH reference slot configuration including one or more second RACH reference slots associated with a plurality of first RACH reference slots, e.g., as described in connection with 702 in FIG. 7. The RACH configuration component 1040 may be configured to transmit, to the base station, RACH communication based on the RACH reference slot configuration, e.g., as described in connection with 704 in FIG. 7.

The apparatus may include additional components that perform each of the blocks of the algorithm in the flowcharts of FIGS. 6 and 7. As such, each block in the flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving, from a base station, an indication of a RACH reference slot configuration including one or more second RACH reference slots associated with a plurality of first RACH reference slots. The apparatus 1002 may include means for transmit, to the base station, RACH communication based on the RACH reference slot configuration.

In one configuration, the indication may be received via a SIB1, RRC signaling, a MAC-CE, or DCI. In one configuration, the one or more second RACH reference slots may be new RACH reference slots, and the plurality of first RACH reference slots may be previously existing RACH reference slots. In one configuration, the RACH reference slot configuration may include each of the one or more second RACH reference slots configured to be adjacent to at least one of the plurality of first RACH reference slots. In one configuration, the RACH reference slot configuration may be predetermined or preconfigured. In one configuration, beginning with a first N of the one or more second RACH reference slots located before or after a predetermined or preconfigured one of the plurality of first RACH reference slots, a subsequent N of the one or more second RACH reference slots may be located after every M of the plurality of first RACH reference slots, where M and N are integers. In one configuration, each of the one or more second RACH reference slots that is associated with a preceding first RACH reference slot may have a predetermined or preconfigured slot number distance from the preceding first RACH reference slot. In one configuration, each of the one or more second RACH reference slots that is associated with a subsequent first RACH reference slot may have a predetermined or preconfigured slot number distance from the subsequent first RACH reference slot. In one configuration, N may be greater than or equal to 2, and any two of the one or more second RACH reference slots that are adjacent to each other may have a predetermined or preconfigured slot number distance between them. In one configuration, a one-to-one correspondence may exist between each of the one or more second RACH reference slots and each of the plurality of first RACH reference slots, and each of the one or more second RACH reference slots and the corresponding one of the plurality of first RACH reference slots may be associated with a predetermined or preconfigured slot number offset. In one configuration, the predetermined or preconfigured slot number offset may be positive or negative. In one configuration, all of the one or more second RACH reference slots may be associated with different UEs or beams than the plurality of first RACH reference slots. In one configuration, all of the one or more second RACH reference slots may be associated with same UEs or beams as the plurality of first RACH reference slots. In one configuration, at least some of the one or more second RACH reference slots may be associated with different UEs or beams than the plurality of first RACH reference slots, and at least some of the one or more second RACH reference slots may be associated with same UEs or beams as the plurality of first RACH reference slots. In one configuration, all of a plurality of SSBs may be associated with a plurality of RACH reference slots in a same association pattern, and the plurality of RACH reference slots may include the one or more second RACH reference slots and the plurality of first RACH reference slots. In one configuration, one or more first SSBs may be associated with at least some of a plurality of RACH reference slots in a first association pattern. One or more second SSBs may be associated with at least some of the plurality of RACH reference slots in a second association pattern. The plurality of RACH reference slots may include the one or more second RACH reference slots and the plurality of first RACH reference slots.

The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
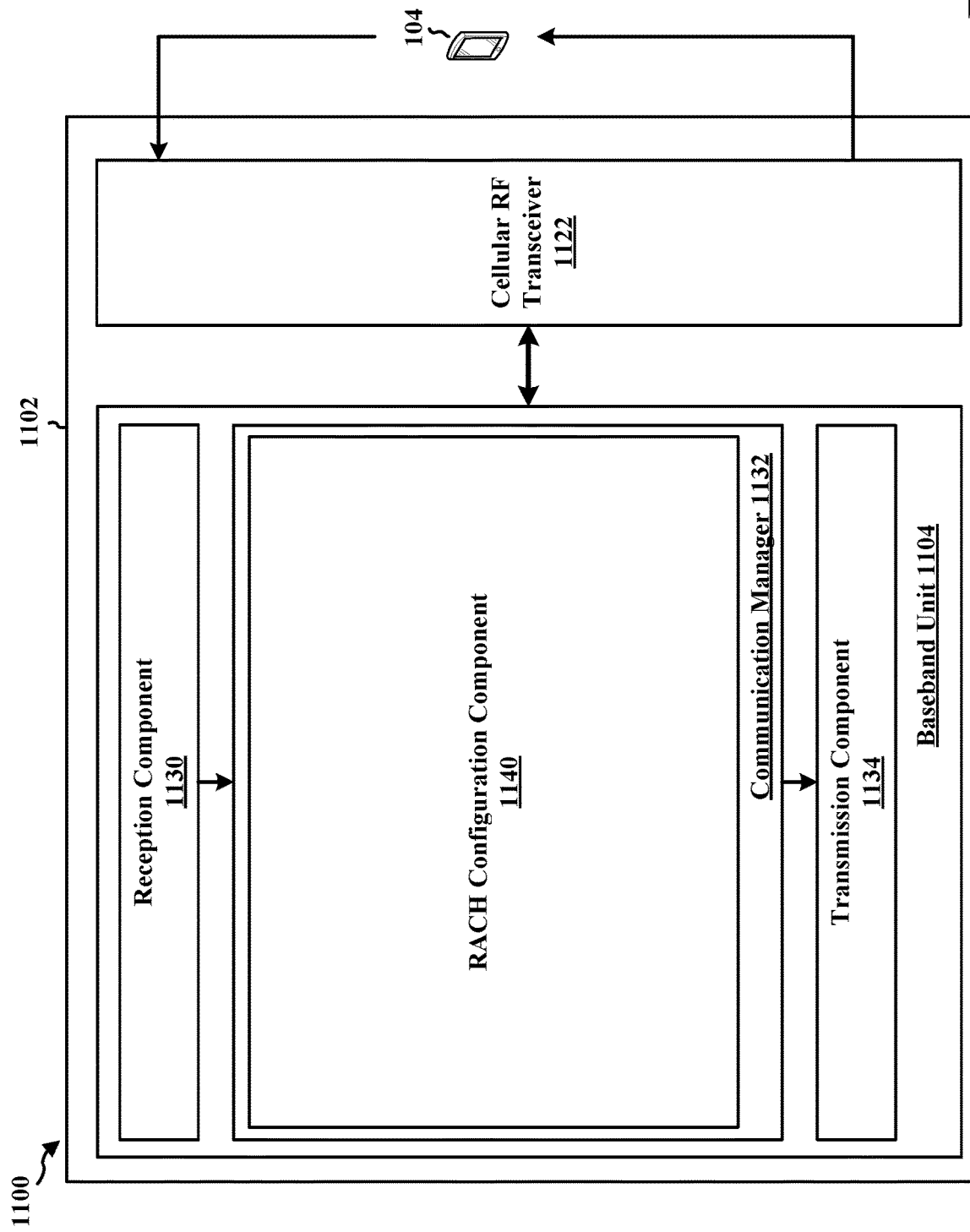
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1002 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a RACH configuration component 1140 that may be configured to select whether to configure one or more second RACH reference slots associated with a plurality of first RACH reference slots in a RACH configuration period, e.g., as described in connection with 802 in FIGS. 8 and 902 in FIG. 9. The RACH configuration component 1140 may be configured to identify, upon selecting to configure the one or more second RACH reference slots, a RACH reference slot configuration including the one or more second RACH reference slots associated with the plurality of first RACH reference slots in the RACH configuration period, e.g., as described in connection with 804 in FIGS. 8 and 904 in FIG. 9. The RACH configuration component 1140 may be configured to transmit, to at least one UE, an indication of the RACH reference slot configuration including the one or more second RACH reference slots associated with the plurality of first RACH reference slots, e.g., as described in connection with 806 in FIGS. 8 and 906 in FIG. 9. The RACH configuration component 1140 may be configured to receive, from the at least one UE, RACH communication based on the RACH reference slot configuration, e.g., as described in connection with 908 in FIG. 9.

The apparatus may include additional components that perform each of the blocks of the algorithm in the flowcharts of FIGS. 6, 8, and 9. As such, each block in the flowcharts of FIGS. 6, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for selecting whether to configure one or more second RACH reference slots associated with a plurality of first RACH reference slots in a RACH configuration period. The apparatus 1102 may include means for identifying, upon selecting to configure the one or more second RACH reference slots, a RACH reference slot configuration including the one or more second RACH reference slots associated with the plurality of first RACH reference slots in the RACH configuration period. The apparatus 1102 may include means for transmitting, to at least one UE, an indication of the RACH reference slot configuration including the one or more second RACH reference slots associated with the plurality of first RACH reference slots.

In one configuration, the apparatus 1102 may further include means for receiving, from the at least one UE, RACH communication based on the RACH reference slot configuration. In one configuration, the indication may be transmitted via a SIB1, RRC signaling, a MAC-CE, or DCI. In one configuration, the one or more second RACH reference slots may be new RACH reference slots, and the plurality of first RACH reference slots may be previously existing RACH reference slots. In one configuration, the RACH reference slot configuration may include each of the one or more second RACH reference slots configured to be adjacent to at least one of the plurality of first RACH reference slots. In one configuration, the RACH reference slot configuration may be predetermined or preconfigured. In one configuration, beginning with a first N of the one or more second RACH reference slots located before or after a predetermined or preconfigured one of the plurality of first RACH reference slots, a subsequent N of the one or more second RACH reference slots may be located after every M of the plurality of first RACH reference slots, where M and N are integers. In one configuration, each of the one or more second RACH reference slots that is associated with a preceding first RACH reference slot may have a predetermined or preconfigured slot number distance from the preceding first RACH reference slot. In one configuration, each of the one or more second RACH reference slots that is associated with a subsequent first RACH reference slot may have a predetermined or preconfigured slot number distance from the subsequent first RACH reference slot. In one configuration, N is greater than or equal to 2, and any two of the one or more second RACH reference slots that are adjacent to each other may have a predetermined or preconfigured slot number distance between them. In one configuration, a one-to-one correspondence may exist between each of the one or more second RACH reference slots and each of the plurality of first RACH reference slots, and each of the one or more second RACH reference slots and the corresponding one of the plurality of first RACH reference slots may be associated with a predetermined or preconfigured slot number offset. In one configuration, the predetermined or preconfigured slot number offset may be positive or negative. In one configuration, all of the one or more second RACH reference slots may be associated with different UEs or beams than the plurality of first RACH reference slots. In one configuration, all of the one or more second RACH reference slots may be associated with same UEs or beams as the plurality of first RACH reference slots. In one configuration, at least some of the one or more second RACH reference slots may be associated with different UEs or beams than the plurality of first RACH reference slots, and at least some of the one or more second RACH reference slots may be associated with same UEs or beams as the plurality of first RACH reference slots. In one configuration, all of a plurality of SSBs may be associated with a plurality of RACH reference slots in a same association pattern, and the plurality of RACH reference slots may include the one or more second RACH reference slots and the plurality of first RACH reference slots. In one configuration, one or more first SSBs may be associated with at least some of a plurality of RACH reference slots in a first association pattern. One or more second SSBs may be associated with at least some of the plurality of RACH reference slots in a second association pattern. The plurality of RACH reference slots may include the one or more second RACH reference slots and the plurality of first RACH reference slots.

The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Therefore, according to aspects described herein, a base station may select whether to configure one or more second RACH reference slots associated with a plurality of first RACH reference slots in a RACH configuration period. The one or more second RACH reference slots may be new RACH reference slots, and the plurality of first RACH reference slots may be previously existing RACH reference slots. The base station may identify, upon selecting to configure the one or more second RACH reference slots, a RACH reference slot configuration including the one or more second RACH reference slots associated with the plurality of first RACH reference slots in the RACH configuration period. The base station may transmit to a UE, and the UE may receive from the base station, an indication of the RACH reference slot configuration including the one or more second RACH reference slots associated with the plurality of first RACH reference slots. The UE may transmit to the base station, and the base station may receive from the UE, RACH communication based on the RACH reference slot configuration. Accordingly, new RACH reference slots may be added in a RACH configuration period with a minimal impact on the prespecified configurations, such that the RACH capacity may be maintained or even increased when the number of ROs multiplexed in the frequency domain are reduced due to the total RO bandwidth exceeding the maximum UE bandwidth constraint when the system operates in higher bands.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, an indication of a RACH reference slot configuration including one or more second RACH reference slots associated with a plurality of first RACH reference slots; and transmit, to the base station, RACH communication based on the RACH reference slot configuration.

Aspect 2 is the apparatus of aspect 1, where the indication is received via a SIB1, RRC signaling, a MAC-CE, or DCI.

Aspect 3 is the apparatus of any of aspects 1 and 2, where the one or more second RACH reference slots are new RACH reference slots, and the plurality of first RACH reference slots are previously existing RACH reference slots.

Aspect 4 is the apparatus of any of aspects 1 to 3, where the RACH reference slot configuration includes each of the one or more second RACH reference slots configured to be adjacent to at least one of the plurality of first RACH reference slots.

Aspect 5 is the apparatus of any of aspects 1 to 4, where the RACH reference slot configuration is predetermined or preconfigured.

Aspect 6 is the apparatus of any of aspects 1 to 5, where beginning with a first N of the one or more second RACH reference slots located before or after a predetermined or preconfigured one of the plurality of first RACH reference slots, a subsequent N of the one or more second RACH reference slots are located after every M of the plurality of first RACH reference slots, where M and N are integers.

Aspect 7 is the apparatus of aspect 6, where each of the one or more second RACH reference slots that is associated with a preceding first RACH reference slot has a predetermined or preconfigured slot number distance from the preceding first RACH reference slot.

Aspect 8 is the apparatus of aspect 6, where each of the one or more second RACH reference slots that is associated with a subsequent first RACH reference slot has a predetermined or preconfigured slot number distance from the subsequent first RACH reference slot.

Aspect 9 is the apparatus of aspect 6, where N is greater than or equal to 2, and any two of the one or more second RACH reference slots that are adjacent to each other have a predetermined or preconfigured slot number distance between them.

Aspect 10 is the apparatus of any of aspects 1 to 5, where a one-to-one correspondence exists between each of the one or more second RACH reference slots and each of the plurality of first RACH reference slots, and each of the one or more second RACH reference slots and the corresponding one of the plurality of first RACH reference slots are associated with a predetermined or preconfigured slot number offset.

Aspect 11 is the apparatus of aspect 10, where the predetermined or preconfigured slot number offset is positive or negative.

Aspect 12 is the apparatus of any of aspects 1 to 10, where all of the one or more second RACH reference slots are associated with different UEs or beams than the plurality of first RACH reference slots.

Aspect 13 is the apparatus of any of aspects 1 to 10, where all of the one or more second RACH reference slots are associated with same UEs or beams as the plurality of first RACH reference slots.

Aspect 14 is the apparatus of any of aspects 1 to 10, where at least some of the one or more second RACH reference slots are associated with different UEs or beams than the plurality of first RACH reference slots, and at least some of the one or more second RACH reference slots are associated with same UEs or beams as the plurality of first RACH reference slots.

Aspect 15 is the apparatus of any of aspects 1 to 14, where all of a plurality of SSBs are associated with a plurality of RACH reference slots in a same association pattern, and the plurality of RACH reference slots include the one or more second RACH reference slots and the plurality of first RACH reference slots.

Aspect 16 is the apparatus of any of aspects 1 to 14, where one or more first SSBs are associated with at least some of a plurality of RACH reference slots in a first association pattern, one or more second SSBs are associated with at least some of the plurality of RACH reference slots in a second association pattern, and the plurality of RACH reference slots include the one or more second RACH reference slots and the plurality of first RACH reference slots.

Aspect 17 is the apparatus of any of aspects 1 to 16, further including a transceiver coupled to the at least one processor.

Aspect 18 is an apparatus for wireless communication at a base station including at least one processor coupled to a memory and configured to select whether to configure one or more second RACH reference slots associated with a plurality of first RACH reference slots in a RACH configuration period; identify, upon selecting to configure the one or more second RACH reference slots, a RACH reference slot configuration including the one or more second RACH reference slots associated with the plurality of first RACH reference slots in the RACH configuration period; and transmit, to at least one UE, an indication of the RACH reference slot configuration including the one or more second RACH reference slots associated with the plurality of first RACH reference slots.

Aspect 19 is the apparatus of aspect 18, the at least one processor being further configured to: receive, from the at least one UE, RACH communication based on the RACH reference slot configuration.

Aspect 20 is the apparatus of any of aspects 18 and 19, where the indication is transmitted via a SIB1, RRC signaling, a MAC-CE, or DCI.

Aspect 21 is the apparatus of any of aspects 18 to 20, where the one or more second RACH reference slots are new RACH reference slots, and the plurality of first RACH reference slots are previously existing RACH reference slots.

Aspect 22 is the apparatus of any of aspects 18 to 21, where the RACH reference slot configuration includes each of the one or more second RACH reference slots configured to be adjacent to at least one of the plurality of first RACH reference slots.

Aspect 23 is the apparatus of any of aspects 18 to 22, where the RACH reference slot configuration is predetermined or preconfigured.

Aspect 24 is the apparatus of any of aspects 18 to 23, where beginning with a first N of the one or more second RACH reference slots located before or after a predetermined or preconfigured one of the plurality of first RACH reference slots, a subsequent N of the one or more second RACH reference slots are located after every M of the plurality of first RACH reference slots, where M and N are integers.

Aspect 25 is the apparatus of aspect 24, where each of the one or more second RACH reference slots that is associated with a preceding first RACH reference slot has a predetermined or preconfigured slot number distance from the preceding first RACH reference slot.

Aspect 26 is the apparatus of aspect 24, where each of the one or more second RACH reference slots that is associated with a subsequent first RACH reference slot has a predetermined or preconfigured slot number distance from the subsequent first RACH reference slot.

Aspect 27 is the apparatus of aspect 24, where N is greater than or equal to 2, and any two of the one or more second RACH reference slots that are adjacent to each other have a predetermined or preconfigured slot number distance between them.

Aspect 28 is the apparatus of any of aspects 18 to 23, where a one-to-one correspondence exists between each of the one or more second RACH reference slots and each of the plurality of first RACH reference slots, and each of the one or more second RACH reference slots and the corresponding one of the plurality of first RACH reference slots are associated with a predetermined or preconfigured slot number offset.

Aspect 29 is the apparatus of aspect 28, where the predetermined or preconfigured slot number offset is positive or negative.

Aspect 30 is the apparatus of any of aspects 18 to 29, where all of the one or more second RACH reference slots are associated with different UEs or beams than the plurality of first RACH reference slots.

Aspect 31 is the apparatus of any of aspects 18 to 29, where all of the one or more second RACH reference slots are associated with same UEs or beams as the plurality of first RACH reference slots.

Aspect 32 is the apparatus of any of aspects 18 to 29, where at least some of the one or more second RACH reference slots are associated with different UEs or beams than the plurality of first RACH reference slots, and at least some of the one or more second RACH reference slots are associated with same UEs or beams as the plurality of first RACH reference slots.

Aspect 33 is the apparatus of any of aspects 18 to 32, where all of a plurality of SSBs are associated with a plurality of RACH reference slots in a same association pattern, and the plurality of RACH reference slots include the one or more second RACH reference slots and the plurality of first RACH reference slots.

Aspect 34 is the apparatus of any of aspects 18 to 32, where one or more first SSBs are associated with at least some of a plurality of RACH reference slots in a first association pattern, one or more second SSBs are associated with at least some of the plurality of RACH reference slots in a second association pattern, and the plurality of RACH reference slots include the one or more second RACH reference slots and the plurality of first RACH reference slots.

Aspect 35 is the apparatus of any of aspects 18 to 34, further including a transceiver coupled to the at least one processor.

Aspect 36 is a method of wireless communication for implementing any of aspects 1 to 35.

Aspect 37 is an apparatus for wireless communication including means for implementing any of aspects 1 to 35.

Aspect 38 is a computer-readable medium storing computer executable code, where the code when executed by a processor causes the processor to implement any of aspects 1 to 35.

What is claimed is:

1. An apparatus for wireless communication at a user equipment (UE), comprising:
   a memory; and
   at least one processor coupled to the memory and configured to:
   receive, from a base station, an indication of a random access channel (RACH) reference slot configuration including one or more second RACH reference slots associated with a plurality of first RACH reference slots; and
   transmit, to the base station, RACH communication based on the RACH reference slot configuration.

2. The apparatus of claim 1, wherein the indication is received via a system information block (SIB) 1 (SIB 1), radio resource control (RRC) signaling, a media access control (MAC)— control element (CE) (MAC-CE), or downlink control information (DCI).

3. The apparatus of claim 1, wherein the one or more second RACH reference slots are new RACH reference slots, and the plurality of first RACH reference slots are previously existing RACH reference slots.

4. The apparatus of claim 1, wherein the RACH reference slot configuration includes each of the one or more second RACH reference slots configured to be adjacent to at least one of the plurality of first RACH reference slots.

5. The apparatus of claim 1, wherein the RACH reference slot configuration is predetermined or preconfigured.

6. The apparatus of claim 1, wherein beginning with a first N of the one or more second RACH reference slots located before or after a predetermined or preconfigured one of the plurality of first RACH reference slots, a subsequent N of the one or more second RACH reference slots are located after every M of the plurality of first RACH reference slots, wherein M and N are integers.

7. The apparatus of claim 6, wherein each of the one or more second RACH reference slots that is associated with a preceding first RACH reference slot has a predetermined or preconfigured slot number distance from the preceding first RACH reference slot.

8. The apparatus of claim 6, wherein each of the one or more second RACH reference slots that is associated with a subsequent first RACH reference slot has a predetermined or preconfigured slot number distance from the subsequent first RACH reference slot.

9. The apparatus of claim 6, wherein N is greater than or equal to 2, and any two of the one or more second RACH reference slots that are adjacent to each other have a predetermined or preconfigured slot number distance between them.

10. The apparatus of claim 1, wherein a one-to-one correspondence exists between each of the one or more second RACH reference slots and each of the plurality of first RACH reference slots, and each of the one or more second RACH reference slots and the corresponding one of the plurality of first RACH reference slots are associated with a predetermined or preconfigured slot number offset.

11. The apparatus of claim 10, further comprising a transceiver coupled to the at least one processor, wherein the predetermined or preconfigured slot number offset is positive or negative.

12. A method of wireless communication at a user equipment (UE), comprising:
   receiving, from a base station, an indication of a random access channel (RACH) reference slot configuration including one or more second RACH reference slots associated with a plurality of first RACH reference slots; and
   transmitting, to the base station, RACH communication based on the RACH reference slot configuration.

* * * * *